United States Patent

James

3,910,006

Oct. 7, 1975

[54] FUEL ELEMENT HANDLING ARRANGEMENT AND METHOD

[75] Inventor: Benjamin James, Pittsburgh, Pa.

[73] Assignee: Westinghouse Electric Corporation, Pittsburgh, Pa.

[22] Filed: June 7, 1973

[21] Appl. No.: 367,992

[52] U.S. Cl............... 53/37; 53/268; 214/17 B; 214/18 N
[51] Int. Cl............................... B65b 5/00
[58] Field of Search........... 53/35, 36, 37, 236, 244, 53/249, 268, 271, 275; 214/16 R, 17 R, 17 B, 18 N, 152; 252/301.1 W

[56] References Cited
UNITED STATES PATENTS

| | | | |
|---|---|---|---|
| 2,942,393 | 6/1960 | Taylor | 53/249 |
| 3,137,397 | 6/1964 | Nicoll et al. | 214/17 B |
| 3,637,096 | 1/1972 | Crate | 214/17 B |
| 3,765,549 | 10/1973 | Jones | 214/17 B |

Primary Examiner—Robert L. Spruill
Attorney, Agent, or Firm—J. R. Campbell

[57] ABSTRACT

An arrangement and method are disclosed for canistering fuel elements from a nuclear reactor. The canister or shipping container, is positioned in a space provided under a fluid-filled, fuel storage structure. Lift means vertically lifts the canister into sealing relationship with a port in the underside of the structure. Removal of port and canister closures exposes the interior of the structure to the interior of the canister. Fuel elements are then transferred from the structure into the canister. Replacement of the closures followed by lowering and sealing of the canister completes the canistering operation.

The disclosed arrangement accommodates uncanistering fuel elements by following the procedure in reverse.

14 Claims, 4 Drawing Figures

FUEL ELEMENT HANDLING ARRANGEMENT AND METHOD

BACKGROUND OF THE INVENTION

1. Field of the Invention

This invention pertains to refueling systems for nuclear reactors, and more particularly to the canistering of spent fuel elements from a nuclear reactor and to the uncanistering of new fuel elements for use in a nuclear reactor.

2. Description of the Prior Art

In nuclear reactor terminology, "spent fuel" is the name commonly employed to denote used fuel elements, that is, fuel elements which have powered a nuclear reactor over an extended period of time such that they are no longer capable of efficiently sustaining a nuclear chain reaction. Upon removal from the core of a nuclear reactor, spent fuel elements are temporarily stored then shipped off-site for reprocessing and future use. However, since the spent fuel elements are highly radioactive because of reactor operation, a number of significant problems are encountered. One such problem is the necessity for remotely handling the spent fuel elements during on-site fuel transfer operations. Another such problem is a necessity to provide adequate shielding to protect personnel from the hazards of radiation during these transfer operations. Shielding is also required during storage of the fuel while the fuel is either on or off the site of the nuclear reactor. Still another such problem and perhaps the most significant, is the necessity for cooling the spent fuel. Cooling must be maintained until such time that the heat produced by decaying radioactivity of the spent fuel elements does not produce any adverse effects such as melting of the fuel or melting of on-site storage facilities.

One technique conventionally utilized in the nuclear reactor art to alleviate the problems associated with decay heat is to store and ship the spent fuel elements completely immersed in a coolant, such as water. Another technique is to store the spent fuel elements in a coolant in specially designed spent fuel pits located at the reactor site. Site storage being continued until such time that the level of radiation has sufficiently decayed and the heat produced thereby is no longer of any practical consequence; hence, the spent fuel elements may thereafter be stored and shipped in an inert atmosphere, such as helium or nitrogen.

In accordance with the prior art then, canistering of spent fuel elements for shipment from light water nuclear reactors includes immersing a shipping cask into a water filled pit in which spent fuel is being stored. The spent fuel elements are then loaded into the shipping cask with all transfer operations being accomplished under the water. The shipping cask is then sealed, lifted from the water, cleaned, decontaminated and loaded onto a rail car or truck for shipment to a reprocessing or storage site.

Although the above described canistering procedure of the prior art is relatively straightforward, there are some economic penalities associated with the procedure as well as some potentially serious health hazards. For example, a large and expensive crane is required to lift the shipping cask which may weigh as much as 100 tons. Moreover, the building must be designed with extra height above the liquid filled pits to permit the insertion of a link between the crane hook and a lifting hook in order to prevent the crane hook, the wire ropes and the block from being contaminated by the radioactive water in the pits. There is also the ever present possibility of a crane failure causing a drop of the cask into the pit which may result in breaching of the pit bottom and a consequent release of radioactively contaminated water. This latter problem may, of course, be overcome by having a separate pit for the cask with a lock between the spent fuel pit and the cask pit. In addition, to the obvious economic disadvantage of having two separate pits, there is still the possibility of release of radioactively contaminated water from the cask pit in the event of a crane failure.

A more satisfactory arrangement for canistering spent fuel has been proposed in the liquid metal reactor art. Here, spent fuel elements are stored in a spent fuel pit until such time as the decay heat has sufficiently diminished. Then, the spent elements are placed into shipping casks in an inert atmosphere and without the need of having a separate cask pit. In this arrangement, a portion of the storage pit is made to extend laterally, in cantilever fashion, over a space having sufficient height for the positioning therein of a shipping cask mounted on a rail car. A bellows which is sealingly mounted to the underside of the overhanging extension is then extended down and onto the top of the shipping cask and sealingly connected thereto. A plug in the bottom of the storage pit and vertically aligned with the bellows is then removed thereby coupling the interior of the shipping cask with the interior of the storage pit. Canistering of the spent fuel elements can therefore be accomplished with a relatively small crane and a high degree of safety.

It will be appreciated, that the liquid metal reactor arrangement has substantially eliminated the radiological hazards associated with accidently dropping a cask. It will be further appreciated by one skilled in the art that it would be highly advantageous to adapt this liquid metal arrangement to light water nuclear reactors. However, the adaptation may not be made without the introduction of a number of new problems and disadvantages not solved by the prior art. For instance, utilizing a liquid coolant, for example water, in the storage pit would subject a bellows to a differential pressure equal to the height of the water in the storage pit. The requirements imposed by this differential pressure severely complicates the design of a bellows and significantly increase its cost. Also, upon completion of canistering it would be necessary to pump out or drain that relatively large amount of water which fills the bellows between the bottom of the storage pit and the top of the shipping cask. If not removed, this water which may be radioactive contaminated, will spill onto the shipping cask, the rail vehicle and the building floor. Another major disadvantage of this arrangement consists of the inconvenience of servicing a bellow's system which is attached to the underside of a water filled structure.

SUMMARY OF THE INVENTION

The aforementioned canistering problems of the prior art and the apparent problems associated with adapting the latest liquid metal reactor art to light water nuclear reactors are overcome by the present invention. As in the prior art, the present invention utilizes the concept of sealingly mounting the shipping cask to the underside of a portion of a spent fuel storage pit. However, rather than lowering a bellows to make a seal with the cask, a lifting mechanism is used to lift the shipping cask into mating contact with the underside of the spent fuel storage pit. In one embodiment, an O-ring seal is used to effectuate a water tight seal between the spent pit and the cask with the seal being automatically made during the final stage of cask and pit fitup.

A preferred arrangement for the lifting mechanism comprises a hydraulically operated piston on which a platform is mounted and is located directly under the fitup point of the spent fuel pit. This arrangement in combination with a specially designed rail car permits the shipping cask to be removed into position under the spent fuel pit and lifted vertically without having to lift the cask off the shipping car.

After the shipping cask is sealingly mounted to the spent fuel pit, a plug in the bottom of the fuel pit and the shipping cask closure head are removed. Spent elements are then loaded into the cask with the aid of a crane located above the spent fuel storage pit. Upon completion of loading, the closure head and the plug are replaced and the shipping cask is lowered onto the rail car. The cask is then moved to a decontamination area where the cask is sealed and decontaminated in preparation for subsequent transferal to a reprocessing site.

BRIEF DESCRIPTION OF THE DRAWINGS

Other advantages of the invention will be apparent from the following detailed description taken in consideration with the accompanying drawings in which.

DESCRIPTION OF THE PREFERRED EMBODIMENTS

Figure 1:
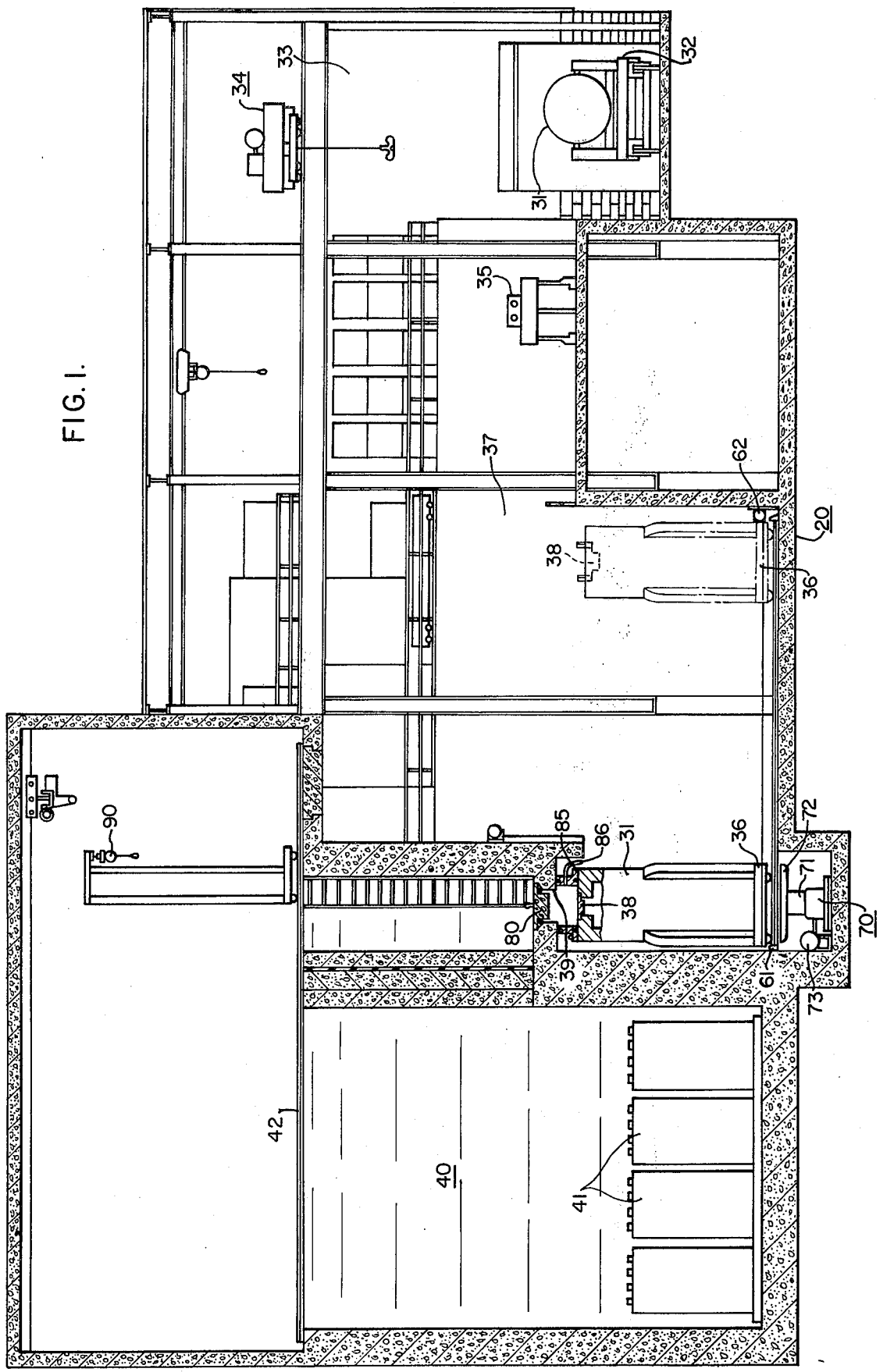
FIG. 1 is a front view, partially in section, of one arrangement of a building incorporating the principal features of this invention.

Throughout the description which follows, like reference characters indicate like elements in the various figures of the drawings.

Figure 2:
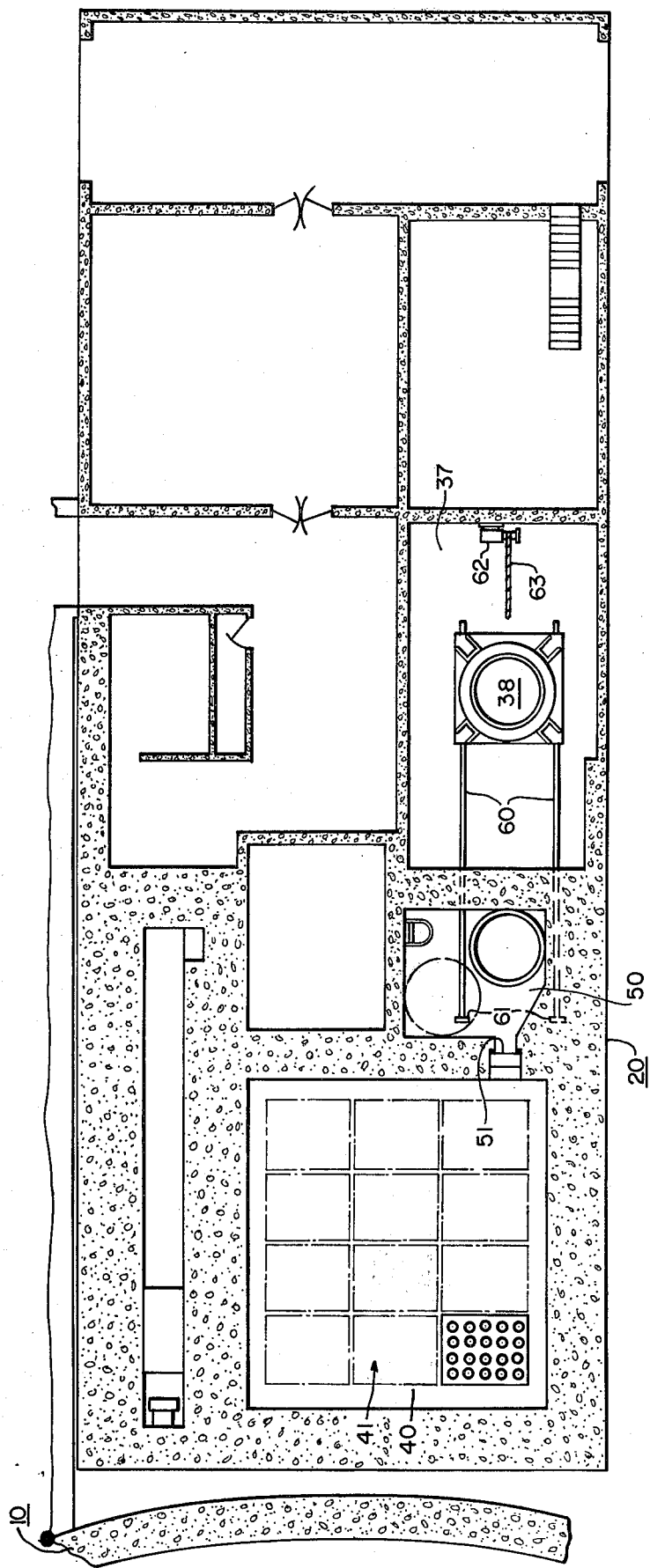
FIG. 2 is a top view of the building of FIG. 1.

FIG. 1 illustrates a portion of an auxiliary building of a nuclear power plant. An auxiliary building typically contains those nuclear systems and equipment which are not required by safety regulations to be placed within the containment building of a nuclear reactor. Within the containment building are such apparatus as the nuclear steam supply which includes the reactor vessel, main coolant pumps, steam generators, accumulators, pressurizers and other like equipment. That portion of the building designated by the numeral 10 in FIGS. 1 and 2 represent the containment building of a typical commercial nuclear power plant. One use of the auxiliary building, which is designated by the number 20 in FIGS. 1 and 2, is to store both new fuel and spent fuel and the equipment, such as cranes, necessary to manipulate the nuclear fuel elements. Although not shown in the drawings, another building which is conventionally known as the turbine building, is included with a typical nuclear power plant. The turbine building, as its name implies, contains the steam turbines and electrical generators which transforms steam produced by the nuclear power plant into useful electrical energy.

As illustrated by the drawings, canistering of spent fuel elements begins with a shipping cask 31 being brought into a bay area 33 of the auxiliary building 20 on a rail car 32. Rail car 32 is especially adapted for such use. The shipping cask 31 is transported in a horizontal position on the rail car 32 because of its extreme length. If shipped vertically, the length of the cask would exceed shipping height regulations. Bay area 33 is provided with sufficient unobstructed height above the rail car to enable the performance of all cask handling operations without interference. A trolley mounted overhead crane 34 having a large capacity, in the order of 100 tons or more, is utilized to place the shipping cask 31 in an upright or vertical position on rail car 32. A cask lifting beam 35 is then mounted onto the shipping cask 31. The shipping cask 31 is then unloaded from the rail car 32 and vertically placed onto a wheeled dolly or air pallet 36 in an area 37 of the building known as the decontamination area.

In decontamination area 37, the shipping cask closure head 38 is unbolted, removed from the shipping cask and appropriately stored. At this time the shipping cask is completely cleaned, both inside and out tested for leakage and generally inspected. The closure head 38 is then put back on the cask but is not bolted to the cask. Cask 31 is then moved beneath a loading port 39 which is located in the bottom of a cask loading pit 50 which may be envisioned as being mounted to the side of a spent fuel pit 40.

The spent fuel pit 40 occupies the portion of the auxiliary building 20 as illustrated by the drawings. In the example shown, there are twelve spent fuel storage racks 41 in the spent fuel pit 40 with each storage rack containing as many as 20 individual fuel assemblies. The spent fuel pit 40 is filled with water which acts as a radiation shield for personnel who might be working on a spent fuel bridge 42 located directly above the spent fuel pit. The water in the spent fuel pit additionally provides cooling for the stored spent fuel elements. The cask loading pit 50 is not generally used for the storage of spent fuel elements; hence it does not usually contain water. It is however filled with water during fuel canistering operations. The cask loading pit 50 serves to provide a transition pit between the spent fuel pit 40 and the shipping cask 31 attached to the underside of the cask loading pit 50. A concrete lock 51 provides a water seal between the spent fuel pit 40 and the cask loading pit 50 during such times as fuel canistering is not being conducted.

The bottom of the cask loading pit 50 is positioned above the bottom of the spent fuel storage pit 40 by a distance approximately equal to the height of the shipping cask 31. In this manner, the shipping cask 31, when placed under cask loading port 39, is substantially co-extensive with the storage racks 41 in the spent fuel storage pit 40. With this arrangement, a spent fuel element may be vertically lifted from within one of the storage racks 41 and transferred to a location directly over shipping cask 31 without having to be raised above the water level in either the spent fuel pit 40 or the cask loading pit 50. Lock 51 is made movable to enable horizontal transfer of spent fuel elements without requiring the spent fuel elements to be lifted over lock 51. It is to be noted that the particular arrangement thus far described is only one of many possible arrangements which may be successfully utilized in acomplishing the principle objectives of the invention; however, the invention is not to be thereby limited.

Transfer of an empty shipping cask 31 from the decontamination area 37 to a location directly under the cask loading port 39 is accomplished by means of a cask transfer car 36 in conjunction with rails 60. By accurate positioning of the rails 60 and accurately locating positive stops 61 on the rails, the cask 31 may be positioned directly under the cask loading port 31 so that proper fitup between the cask and the loading port is assured.

Any of a number of simple drive mechanisms may be employed to move the transfer car 36, upon which the cask 31 is located, either to a position under the loading port 39 or to the decontamination area. For example, a traction motor (not shown) may be directly connected to the wheels of transfer car 36; or, a motor driven winch 62 may be mounted to the auxiliary building 20 and connected to transfer car 36 by cable 63; or, transfer car 36 may be equipped with fans for lifting the car and the cask off the ground and for horizontally propelling the cask transfer car 36. All arrangements thereby allowing for remote operation and exact positioning of the cask.

Figure 4:
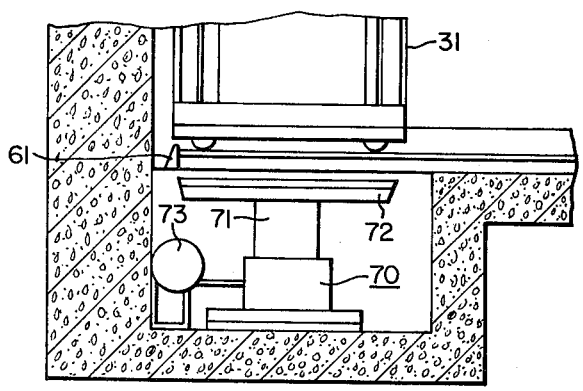
FIG. 4 illustrates a preferred method of vertically lifting the shipping cask into fitup with the spent fuel pit.

Referring now to FIG. 4, a preferred method for vertically raising the shipping cask 31 into sealing attachment with the loading port 39 is illustrated therein. When transfer car 36 is limited from further horizontal movement by contact with positive stops 61, the shipping cask 31 is directly under the loading port 39 and is directly over a cask lifting mechanism 70. In the example shown, lifting mechanism 70 comprises a hydraulically operated piston 71 having a platform 72 mounted thereon. A conventional hydraulic motor 73 supplies the lifting apparatus 70 with the fluid force necessary to raise, smoothly, shipping cask 31 while providing for varying increments of vertical motion. An included feature of lifting mechanism 70 is capable of reversing the flow of hydraulic fluid thereby causing the shipping cask 31 to be lowered. Platform 72 is designed to fit within rails 60 without interfering with the rolling and guiding apparatus or transfer car 36 and to firmly contact the underside of the car 36.

Figure 3:
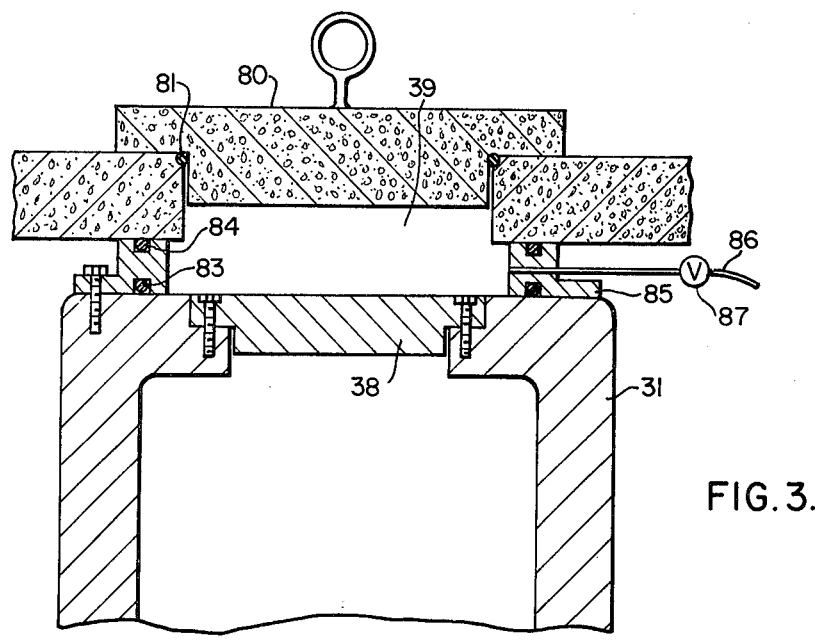
FIG. 3 illustrates the details of one arrangement of the fitup between the shipping cask and the spent fuel storage pit.

The details of sealingly mounting the shipping cask 31 to the loading port is shown in FIG. 3. The loading port 39 is sealed during times other than canistering fuel elements by a plug 80. A seal 81 is utilized between the plug 80 and the port 39 to assure proper sealing of the cask loading pit 50 thereby preventing leakage of water which may be radioactively contaminated. A cap 85 having an annular configuration is mounted, such as by bolting, to the cask 31. Another seal 83 is provided to effectuate a leakproof joint at the cap to cask interface. Still another seal 84 is provided for sealing between the cap 85 and the cask loading pit 50. Cap 85 thus permits the cask 31 to be sealingly mounted to cask loading pit 50 at the location of the loading port 39. With this arrangement, it is seen that the cask to pit seal is automatically made by lifting the cask 31 into firm contact with the cask loading pit 50. This arrangement also automatically corrects for fairly major discrepancies in lateral alignment between the shipping cask 31 and the loading port 39.

With the shipping cask 31 mated to the cask loading pit 50, the cask loading pit is filled with water and port plug 80 is lifted out of position and stored with the aid of fuel crane 90. Similarly, the previously unbolted cask head 38 is removed and stored. The interior of the shipping cask 31 is now directly exposed to the interior of the cask pit 50 and indirectly exposed to the interior of the spent fuel pit 40. Upon moving aside lock 51 between the spent fuel pit 40 and the cask pit 50, the shipping cask 31 is directly exposed to the spent fuel pit 40 and fuel canistering may commence. The spent fuel elements from within the storage racks 41 are then loaded into the shipping cask 31 using the fuel crane 90.

Upon completion of loading the cask 31, the cask head 38 is replaced on the cask 31 and the port plug 80 is replaced in the cask loading port 39. Lock 51 is then repositioned and the water is removed from the cask loading pit 50. The water trapped within loading port 39 is then drained into an appropriate receptacle (not shown) by opening 87, FIG. 3, connected to drain line 86. While some water is still trapped below the level of drain line 86 within cap 85, it will be appreciated that the shipping cask 31 may nonetheless be lowered without any possibility of spilling radioactively contaminated water. The water still trapped within cap 85 may be removed with conventional means such as a vacuum line when the cask is fully lowered and moved back to the decontamination area 37. At the decontamination area 37, the cask head 38 is bolted to the cask and the cask is decontaminated by flushing with water. The shipping cask is then lifted by crane 34 and placed horizontally on rail car 32 whereupon the canistering operation is completed.

It is to be observed that uncanistering of new fuel elements may readily be accomplished in accordance with the method and apparatus of this invention. A procedure generally reversed to that described above may be utilized to transfer new fuel elements from a shipping cask arriving by rail to a new fuel pit which is located within the auxillary building 20.

It will therefore be apparent that there has been disclosed a method and apparatus for canistering spent fuel elements from a light water nuclear reactor. A shipping container is lifted vertically into mating contact and sealing relationship with the underside of a spent fuel pit. Closures sealing the cask and pit are removed and spent fuel elements are loaded into the cask. Reclosure of the shipping cask and the spent fuel pit followed by lowering of the shipping cask completes the fuel canistering operation. Since the invention eliminates the need of lowering a shipping cask into the spent fuel pit, the invention eliminates the possibility of accidently dropping the shipping cask and breaching the spent fuel pit; thus, a positively safe fuel canistering arrangement is provided.

Since numerous changes may be made in the above described apparatus, and different embodiments of the invention may be made without departing from the spirit and scope thereof, it is intended that all the matter contained in the foregoing description or shown in the accompanying drawings shall be interpreted as illustrated and not in a limiting sense.

I claim:

1. An arrangement for canistering nuclear fuel elements comprising:

a structure having fuel elements stored therein, said structure being filled with a fluid having radiation shielding properties, a plugged opening in a bottom surface of said structure, a space under said plugged opening for positioning a canister under said structure and in vertical alignment with said plugged opening, said canister serving to contain fuel elements during shipment thereof;

means for lifting said canister vertically upwardly into direct mounting relationship with the underside of said structure and for lowering said canister out of mounting relationship with the underside of said structure;

means for sealing between said canister and said structure when said canister is mounted to said structures; and means for transferring the fuel elements being stored in said structure into said canister.

2. The arrangement of claim 1, wherein said plugged opening is in a bottom surface of a cask loading structure, said cask loading structure being adjacent said fuel storage structure and sealed therefrom by a sealed opening between said structures.

3. The arrangement of claim 2, wherein said cask loading structure is filled with a fluid having radiation shielding properties, and said opening between said cask loading structure and said fuel storage structure is unsealed during loading of fuel elements from said fuel storage structure into said canister.

4. The arrangement of claim 1, wherein said means for lifting and lowering said canister comprise a platform for supporting said canister during lifting and lowering operations, lift apparatus connected to said platform for moving said platform in a vertical direction, and motor means for actuating said lift apparatus.

5. The arrangement of claim 4, wherein said lift apparatus comprises a cylinder, a piston cooperating with said cylinder and mounted for movement with respect thereto, said piston being hydraulically operated, and said motor means for actuating said lift apparatus includes a motor driven hydraulic pump, said hydraulic pump being hydraulically coupled to said piston and cylinder.

6. The arrangement of claim 1, wherein said means for sealing between said canister and said structure comprises an annular member interposed the mating surfaces of said canister and said structure, said annular member circumscribing said plugged opening through the bottom surface of said structure.

7. The arrangement of claim 6, wherein said sealing means includes a pair of elastic annular members, with one elastic member being located between said annular member and said canister and the other elastic member being located between said annular member and said structure, said elastic members mounted within respective grooves circumscribing the opening in said annular member.

8. The arrangement of claim 6, including an opening through the wall of said annular member, said opening having a conduit connected thereto, and valve means included with said conduit for draining fluid trapped within the opening through said annular member during mating contact of said canister with said structure.

9. The arrangement of claim 1, including means for moving said canister into said position under said structure and in vertical alignment with said plugged opening in said structure.

10. The arrangement of claim 9, wherein said means for moving said canister into position under said structure comprises track apparatus extending under said structure, a platform having wheels mounted to said track apparatus, said platform serving to support a canister vertically positioned thereon, and means for moving said platform, with said canister placed thereon, to a location under said structure.

11. A method for canistering nuclear fuel elements comprising:

positioning a canister under a structure containing a fluid having radiation shielding properties, said structure having fuel elements stored therein, and said structure having a plugged opening in a bottom surface thereof which is in vertical alignment with said canister positioned thereunder;

raising said canister vertically upwardly into direct mating contact with said opening in said structure, said mating contact effectuating a sealing relationship between said structure and said canister;

removing said plug from the opening in said structure whereby the interior of said structure is in communication with the interior of said canister;

transferring fuel elements from within said structure into said canister;

replacing said plug in the opening in said structure;

then lowering said canister whereby said canister is uncoupled from said structure.

12. The method of claim 11, including the steps comprising:

unbolting of a canister closure prior to positioning said canister under said structure;

removing said canister closure subsequent to removing said plug from the opening in said structure;

replacing said canister closure subsequent to transferring said fuel elements into said canister and prior to replacing said plug in the opening in said structure;

then rebolting said canister closure subsequent to lowering said canister out of mating contact with said structure whereby said canister is sealed for shipment.

13. The method of claim 11, including the steps comprising:

placing a sealing member onto the surface of said canister for sealingly mating said canister with said structure, said sealing member being added prior to mating contact with said structure;

and draining the fluid trapped within said sealing member after replacing said plug and prior to lowering said canister.

14. The method of claim 11, wherein said canister is placed under a first structure having said plugged opening in the bottom surface thereof, and said fuel elements are being stored in a second structure, said first and said second structures being sealingly connected by a movable lock in a wall therebetween, and including the steps comprising:

filling said second structure with a fluid having radiation shielding properties after said canister is mated thereto;

then opening said lock between said structures prior to transferring fuel elements from within said first structure into said canister.

* * * * *